US006893518B1

(12) United States Patent
Simpson et al.

(10) Patent No.: US 6,893,518 B1
(45) Date of Patent: May 17, 2005

(54) SOL-GEL MANUFACTURED ENERGETIC MATERIALS

(75) Inventors: Randall L. Simpson, Livermore, CA (US); Ronald S. Lee, Livermore, CA (US); Thomas M. Tillotson, Tracy, CA (US); Lawrence W. Hrubesh, Pleasanton, CA (US); Rosalind W. Swansiger, Livermore, CA (US); Glenn A. Fox, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/697,477

(22) Filed: Oct. 29, 2003

Related U.S. Application Data (62) Division of application No. 08/926,357, filed on Sep. 9, 1997, now Pat. No. 6,666,935.

(51) Int. Cl.$^7$ .............................................. D03D 23/00
(52) U.S. Cl. .................................................. 149/109.6
(58) Field of Search ...................................... 149/19.92

(56) References Cited

U.S. PATENT DOCUMENTS 4,019,934 A    4/1977   Takayama et al.
4,380,482 A    4/1983   Sandell
4,585,495 A    4/1986   Honeyman et al.
5,281,286 A    1/1994   Sayles et al.
5,470,406 A  * 11/1995  Ochi et al. ..................... 149/35

* cited by examiner

*Primary Examiner*—Aileen Felton
(74) *Attorney, Agent, or Firm*—Ann M. Lee; Alan H. Thompson (57) ABSTRACT

Sol-gel chemistry is used for the preparation of energetic materials (explosives, propellants and pyrotechnics) with improved homogeneity, and/or which can be cast to near-net shape, and/or made into precision molding powders. The sol-gel method is a synthetic chemical process where reactive monomers are mixed into a solution, polymerization occurs leading to a highly cross-linked three dimensional solid network resulting in a gel. The energetic materials can be incorporated during the formation of the solution or during the gel stage of the process. The composition, pore, and primary particle sizes, gel time, surface areas, and density may be tailored and controlled by the solution chemistry. The gel is then dried using supercritical extraction to produce a highly porous low density aerogel or by controlled slow evaporation to produce a xerogel. Applying stress during the extraction phase can result in high density materials. Thus, the sol-gel method can be used for precision detonator explosive manufacturing as well as producing precision explosives, propellants, and pyrotechnics, along with high power composite energetic materials.

5 Claims, 6 Drawing Sheets

FIG. 3A — GEL MAY BE EXPLOSIVE; MICROPOROSITY: d ≲ ≈ 2 NANOMETER

FIG. 3B — MESOPOROSITY: ≈2 ≲ d ≲ 50 NANOMETER; CRYSTALLITES IN PORES MAY BE EXPLOSIVE

FIG. 3C — EXPLOSIVE POWDERS MAY BE ADDED TO GEL NETWORK

FIG. 3D — THIS MAY BE A FUEL OR OXIDIZER; THIS MAY CONTAIN AN OXIDIZER OR FUEL

FIG. 4A

ENERGETIC GEL

FIG. 4B

NANOCRYSTALLINE

SOL-GEL MANUFACTURED ENERGETIC MATERIALS

RELATED APPLICATIONS

This application is a Divisional of Ser. No. 08/926,357 filed Sep. 9, 1997, now U.S. Pat. No. 6,666,935, and claims priority to this Non-Provisional Application entitled "Sol-Gel Manufactured Energetic Materials" by inventor(s) Randall L. Simpson, Ronald S. Lee, Thomas M. Tillotson, Lawrence W. Hrubesh, Rosalind W. Swansiger, Glenn A. Fox.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to energetic materials, particularly to the manufacture of energetic materials, and more particularly to the manufacture of energetic materials using sol-gel chemistry.

Energetic materials are herein defined as any material which stores chemical energy in a fixed volume. Explosives, propellants, and pyrotechnics are examples of energetic materials. Reaction results from either shock or heat Explosives and propellants may be thought of as a means of storing gas as a "solid". Pyrotechnics typically release much of their energy as heat.

Energetic materials consist of fuels and oxidizers which are intimately mixed. This is done by incorporating fuels and oxidizers within one molecule or through chemical and physical mixtures of separate fuel and oxidizer ingredients. The material may also contain other constituents such as binders, plasticizers, stabilizers, pigments, etc.

Traditional manufacturing of energetic materials involves processing granular solids into parts. These materials may be pressed or cast to shape. Performance properties are strongly dependent on particle size distribution, surface area of the constituents, and void volume. In many cases achieving fast energy release rates, as well as insensitivity to unintended initiation, necessitates the use of small particles ($\leq 100$ $\mu$m) which are intimately mixed. Reproducibility in performance is adversely affected by the difficulties of synthesizing and processing materials with the same particle morphology. Manufacturing these granular substances into complex shapes is often difficult due to limitations in processing highly solid filled materials.

An example of an existing limitation of processing granular solids is in manufacturing energetic materials for detonators. The state-of-the-art now requires the precise synthesis and recrystallization of explosive powders. These powders typically have high surface areas (e.g., >1 m$^2$/g). The powders are weighed and compacted at high pressures to make pellets. Handling fine grain powders is very difficult. Dimensional and mechanical tolerances may be very poor as the pellets may contain no binder. Changes in the density and dimensions of the pellets affect both initiation and detonation properties. Manufacturing rates are also low as the process is usually done one at a time. Certification of material is typically done by expensive, end-use detonation performance testing and not solely by chemical and physical characterization of the explosive powder. As these detonators or initiating explosives are sensitive, machining to shape pressed pellets is typically not done.

Another current limitation is producing precise intimate mixtures of fuels and oxidizers. The energy release rates of energetic materials are determined by the overall chemical reaction rate. Monomolecular energetic materials have the highest power as the energy release rates are primarily determined by intramolecular reactions. However, energy densities can be significantly higher in composite energetic materials. Reaction rates (power) in these systems are typically controlled by mass transport diffusion rates.

The present invention solves many of these prior problems by manufacturing energetic materials through the use of sol-gel chemistry. Sol-gel chemistry is known in the art and broadly described here, but described hereinafter in greater detail to provide an understanding of this technology. In one approach, using sol-gel chemistry, a solution including explosive materials is made. That solution is then gelled to form a cross-linked skeleton, which may be either inert, or reactive, or energetic, and a continuous liquid phase. The liquid phase is then extracted to produce either a xerogel or an aerogel. A solid so produced has high surface area and homogeneity. During the solution stage of the operation, the solution may be easily cast into molds to produce final parts. By applying a stress during removal of the liquid phase, dense parts may be obtained. Alternately, explosive molding powders may be made which can be used as feedstock for pressing operations. The molding beads will have a high degree of uniformity in the microstructure. As these beads are orders of magnitude larger than explosive powders used in traditional processing they may be easily handled. Also, through using sol-gel chemistry the intimacy of mixing can be dramatically improved over mixing granular solids. Numerous synthetic routes may be carried out utilizing sol-gel chemistry in the processing of energetic materials; these include solution addition, powder/particle addition, nano-composites, and functionalized solid networks.

SUMMARY OF THE INVENTION

It is an object of the present invention to produce energetic materials using sol-gel chemistry.

A further object of the invention is to minimize prior problems associated with the manufacturing of energetic materials by the use of sol-gel processing.

A further object of the invention is to produce explosives using sol-gel chemistry which enables microstructural control of the explosive material to the nanometer scale.

Another object of the invention is to manufacture energetic materials using sol-gel chemistry, whereby the intimacy of mixing can be controlled and dramatically improved over the prior procedures of mixing granular solids or epitaxial deposition.

Another object of the invention is produced by sol-gel processing a solid skeleton composed of fuel with the oxidizer trapped within the pores, or vice versa.

Another object of the invention is to provide a process using sol-gel chemistry to create a material that has high energy, such as a strategic rocket propellant with high power, such as an ideal explosive.

Another object of the invention is to provide a process utilizing sol-gel chemistry wherein the sensitivity of the energetic materials can be readily controlled.

Another object of the invention is to utilize sol-gel chemistry in the processing of energetic materials by at least solution addition, powder/particle addition, nano-composites, and functionalized solid networks.

Another object of the invention is to utilize sol-gel chemistry for the preparation of energetic materials with improved homogeneity, and/or can be cast to near-net shapes, and/or can be made into precision molding powders.

Other objects and advantages of the present invention will become apparent from the following description and the accompanying drawings. Basically, the invention involves sol-gel manufactured energetic material and a process utilizing sol-gel chemistry for producing energetic materials. Energetic materials manufactured using sol-gel chemistry possess superior properties in terms of microstructural homogeneity, and/or can be more easily processed and/or processed with greater precision and accuracy, than can be obtained by the prior known technology. The sol-gel manufactured energetic materials can be utilized as precision detonator explosives, precision explosives, propellants, pyrotechnics, and high power composites.

The sol-gel process is a synthetic chemical process where reactive monomers are mixed into a solution; polymerization occurs leading to a highly cross-linked three-dimensional solid network resulting in a gel. The composition, pore and primary particles sizes, gel time, surface areas, and density may be tailored and controlled by the solution chemistry. The gels are then subjected to either supercritical extraction or controlled slow evaporation of the liquid phase from the gel. Supercritical extraction of these gels allows the surface tension of the leaving liquid phase to be reduced to near zero and results in a highly porous skeletal structure which is low density aerogel, while controlled slow evaporation of the liquid phase from the gels leads to a xerogel, which may be high density. Applying stress during the extraction phase can result in high density materials. By use of the sol-gel processing, energetic materials can be made, for example, by solution addition solution exchange, powder/particle addition, functionalized solid network, functionalized explosive network, and micron to submicron scale composite energetic materials.

The methodologies of the above six sol-gel manufacturing techniques are briefly described as follows:

Solution Addition: The energetic material constituent is dissolved in a solvent which is compatible with the reactive monomer and mixed into the pre-gel solution prior to gelation. Upon gelation, the energetic material constituent is uniformly distributed within the pores of the solid network formed by the polymerization of the reactive monomer.

Solution Exchange: After gelation, the liquid phase is exchanged with another liquid which contains an energetic material constituent, thus allowing deposition of the energetic material constituent within the gel.

Powder/Particle Addition: The energetic material constituent, in particulate form, is either mixed with the pre-gel solution or added to a pre-made gel, resulting in a composite of gel and suspended particles.

Functionalized Solid Network: Use of reactive monomers which have functionalized sites dangling throughout the solid network after gelation. Dissolution of the energetic material constituent in mutually compatible solvents and diffusing into the gel allows the energetic material constituent to react and bind to the functionalized site. Thus, the amount of energetic material constituent may be controlled by the number of functionalized sites while ensuring homogeneity at the molecular level.

Functionalized Energetic Network: Functionalizing the energetic material constituent molecules so that they can be reacted in solution to directly form a three dimensional solid (gel) which incorporates the energetic molecules at the finest scale. In this embodiment, the solid network is the energetic material and, if desired, the concentration can be controlled by co-reacting with other inert reactive monomers.

Micron To Sub-Micron (Nano) Scale Composite Energetic Materials: Higher performance energetic materials can be made in which the skeletal structure and the surrounding phase serve as fuels and oxidizers to form a composite energetic material. Conductive gels (e.g., carbon aerogels) may be used as substrates for the electrochemical precipitation of metal fuels, or metals may be deposited within non-conductive aerogels via decomposition from the gas or liquid phase. Void space may then be used for the addition of an oxidizer and other energetic material constituents.

The sol-gel manufacturing of energetic materials solves many of the prior above-described problems associated with the manufacture of energetic materials.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention involves sol-gel manufactured energetic materials and a process for manufacturing the energetic material utilizing sol-gel chemistry. The manufacturing process of this invention solves many of the prior problems associated with the fabrication of energetic materials (explosives, propellants, and pyrotechnics). As pointed out above, energetic materials basically consist of fuel and oxidizers which are intimately mixed, but may also contain other constituents such as binders, plasticizers, stabilizers, pigments, etc. The prior problems associated with mixing of the constituents and forming of these materials into desired shapes have been significantly reduced, if not eliminated, by utilizing sol-gel processing in accordance with the present invention.

Initiation and detonation properties are dramatically affected by the microstructural properties of the explosives. Explosives produced using sol-gel chemistry enable microstructural control to the nanometer scale. Possible applications include: mass production of precision detonator pellets, net shape casting of initiating explosives, optical surface initiation, detonation wave shaping, hydrodynamic fluids, initiation explosive trains, detonation cord, high-power-high-energy composite explosives, low energy density solid high explosives, and desensitization of explosives powders. Basic scientific elements include: initiation and detonation mechanisms in the nanometer range, mass transport and intramolecular reaction kinetics at high pressure and temperature, and sol-gel chemistry.

Figures 1A, 1B:
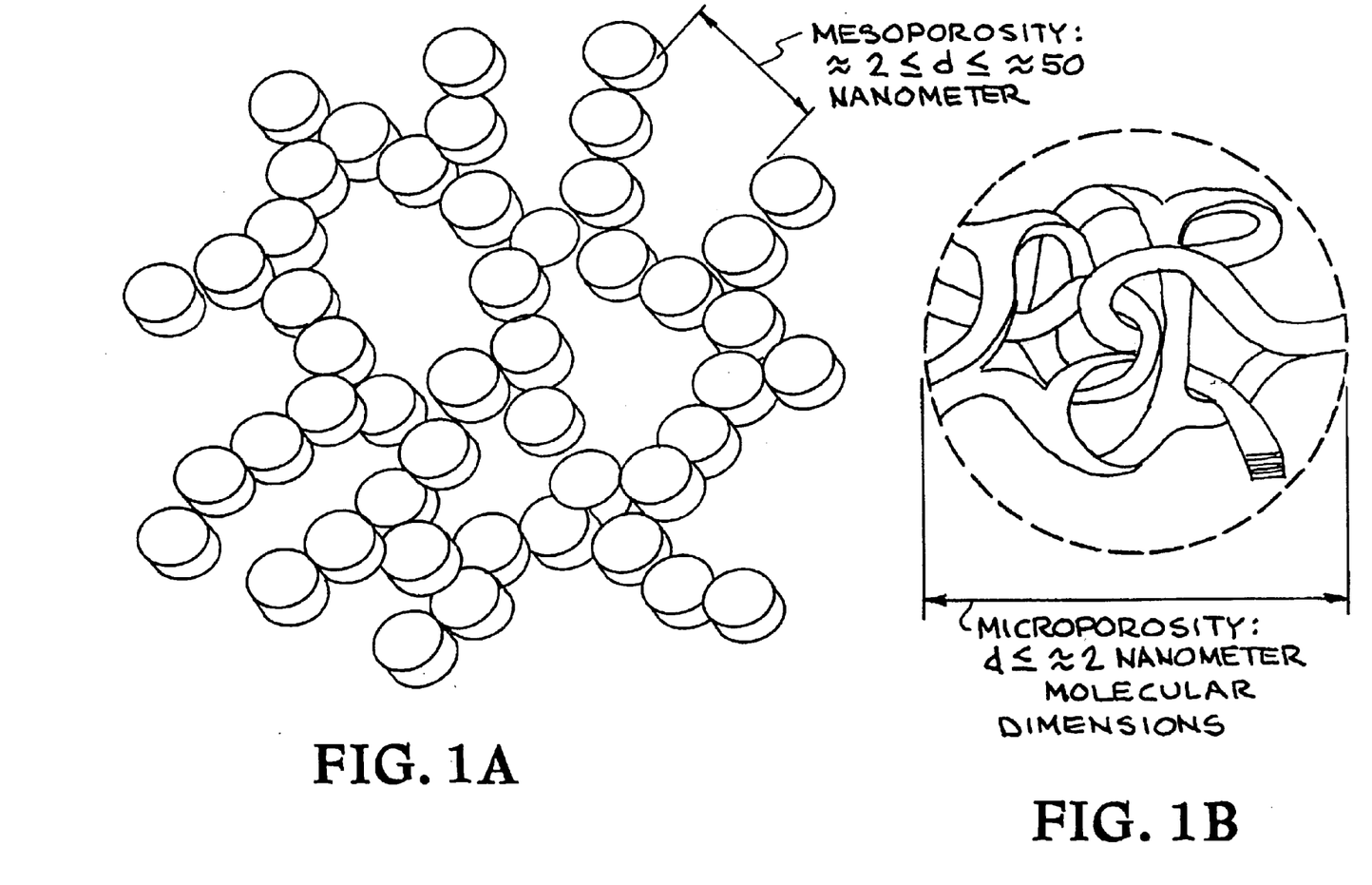
FIGS. 1A and 1B illustrate micro and nanoscale gel structures produced by sol-gel processing.

Sol-gel methodology produces high surface area, porous solids which may be cast to near-net shape. The microstructure, comprised of nanometer-sized pores and linked primary particles, as well as the elemental composition, can be tailored and controlled by solution chemistry. FIGS. 1A and 1B illustrate typical microscale and mesoscale gel structures, with FIG. 1B being an enlargement of a cell of FIG. 1. In FIG. 1A, the arrow indicates the mesoporosity of the gel structures being $\sim 2 \leq d \leq \sim 50$ nanometers, while the arrow in FIG. 1B indicates the microporosity within a cell of the structure being $d \leq \sim$nanometer, with (d) indicating molecular dimensions.

Figure 2:
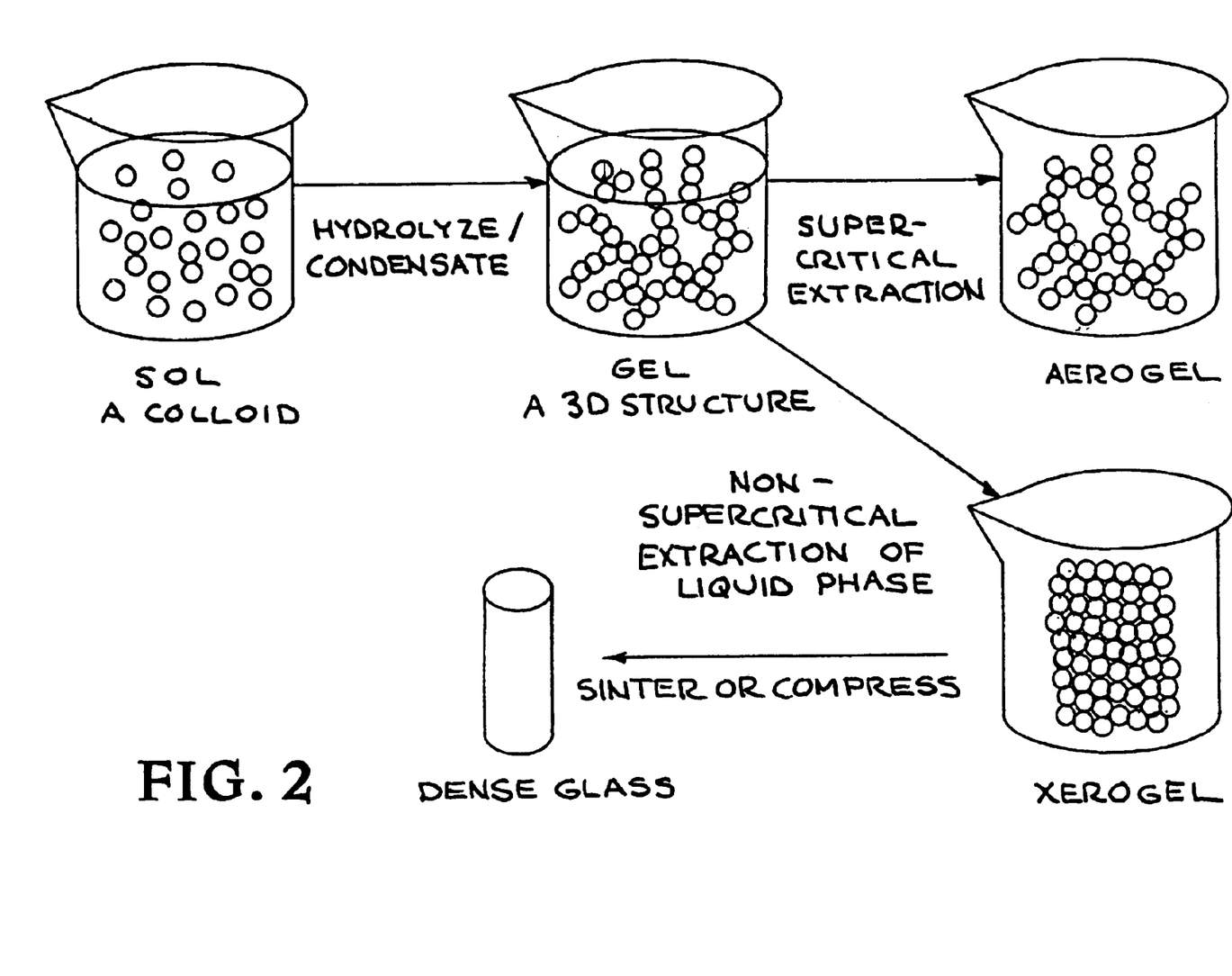
FIG. 2 illustrates the general process for sol-gel synthesis and processing.

The general process for sol-gel synthesis and processing is illustrated in FIG. 2. Monomers are reacted in solution to produce small nanometer size particles, a "sol", which cross-link to form a three-dimensional solid network with the remaining solution residing within open pores, a "gel". Controlled evaporation of the liquid phase in a gel results in a xerogel, while supercritical extraction eliminates the surface tension of the retreating liquid phase, producing highly porous solids, aerogels. Silica aerogel, prepared by supercritically extracting tetramethoxysilane, is one example. Also, carbon aerogels having similar cell structures are produced using supercritical extraction to produce an aerogel or produce a xerogel using controlled evaporation. The gel may be energetic or non-energetic itself, depending on the composition of the solution (sol). Energetic materials may be held within the micro or mesoscale porosity. Solids may be directly added to the gels, and the type of solvent extraction will be determined by the desired composition of the end produce. As a general rule, aerogels have a substantially lower density and higher porosity than xerogels.

The methodology of the present invention solves many problems found in existing state-of-the-art energetic materials synthesis and processing. One example is the pressing of powders of energetic material for detonators and related devices. Low manufacturing rates, difficulty in handling fine powders, and the inability to produce precise geometric shapes may be solved by this approach. Another current experimental limitation is producing precise intimate mixtures of fuels and oxidizers. Using sol-gel chemistry, the intimacy of mixing can be controlled and dramatically improved over the current art of mixing granular solids or epitaxial deposition. A solid skeleton composed of the fuel with the oxidizer trapped within the pores, or vice versa, is envisioned. A material goal that has eluded conventional technology is to create a material that has the high energy of a strategic rocket propellant (roughly two times the energy density of a conventional high explosive) with the power of an ideal explosive.

Perhaps more importantly, however, the sol-gel technology may be able to make energetic materials which have entirely new and desirable properties. A significant observation in a preliminary proof-of-principle experiment is that the presence of the gel structure dramatically decreased the impact sensitivity of an explosive. This result was counter to that expected. If generally true this one technical element could have a dramatic international impact in the handling and processing of explosive materials.

The desensitization of explosive powders as a consequence of gelation may hold true for shock loading as well as impact. A recent detonation experiment (see FIG. 6) found that when an RDX-silica-based xerogel was shocked at pressures adequate to initiate the insensitive high explosive ultrafine TATB it failed to initiate. This is remarkable in that standard nitramine based explosives that have inert binder volumes similar to the RDX-silica xerogel tested are readily initiable.

Increased dimensional control will also enable high quality experiments to be run where chemical and mass transport limited kinetics may be determined more accurately than by conventional approaches. The next generation detonation modeling will focus on chemical kinetics and species equilibration and rely on these data. The computational tools being developed in molecular dynamic and mesoscale simulations of hydrodynamics are commensurate with the nanometer scale dimensions in sot-gel based energetic materials. Thus, sol-gel chemistry offers microstructural control of an explosive matrix not attainable with physical mixing as well as the potential for low cost manufacturing methods not achievable with vapor deposition techniques.

Figures 3A, 3B, 3C, 3D:
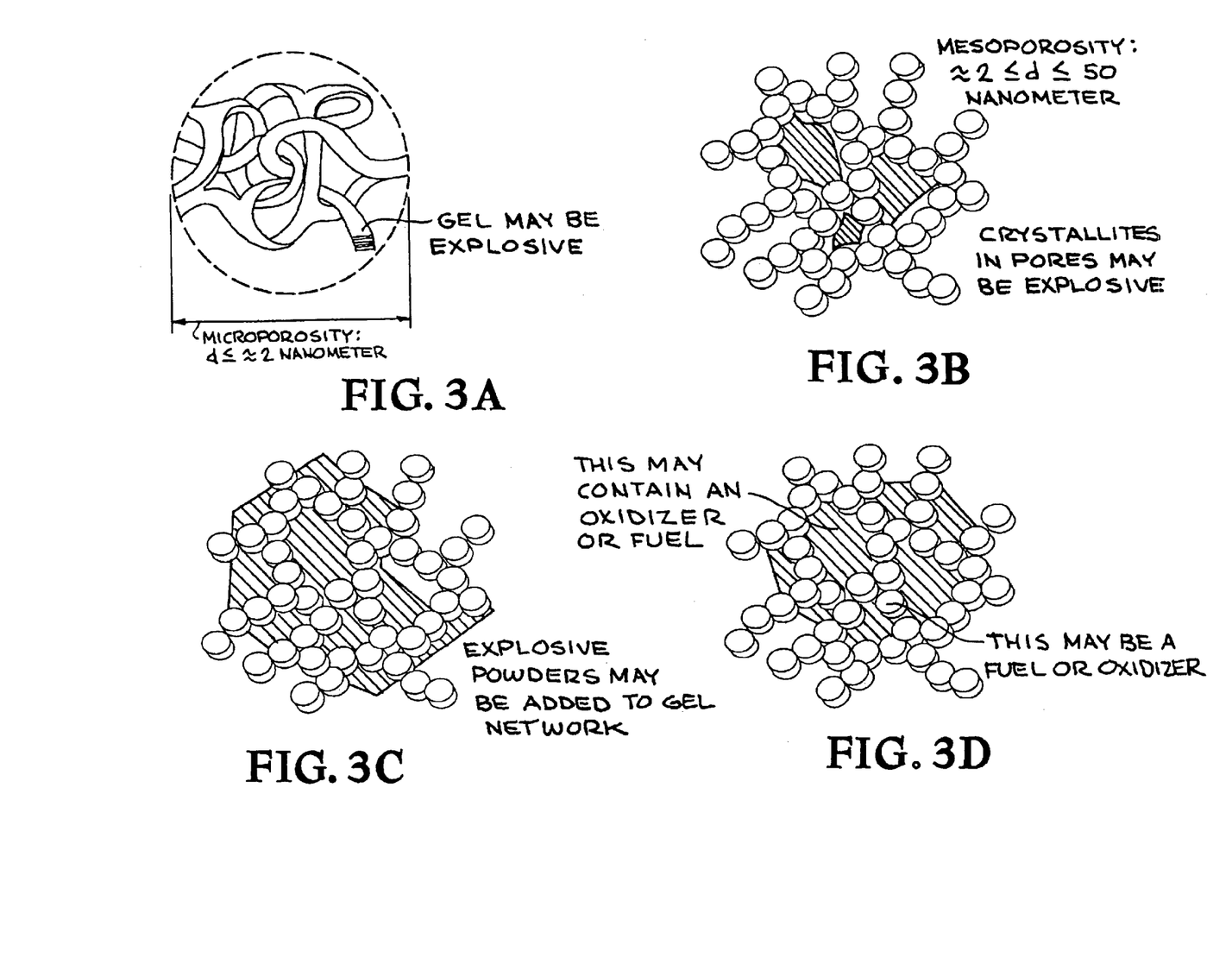
FIGS. 3A–3D illustrate various embodiments in which an explosive (fuel/oxidizer) may be incorporated utilizing sol-gel processing in accordance with the present invention.

FIGS. 3A–3D illustrate different approaches using sol-gel chemistry to produce energetic materials. As shown in FIG. 3A, the gel may be explosive, while in FIG. 3B crystallites in pores may be explosive, while explosive powders may be added to the gel network, as shown in FIG. 3C, or as shown in FIG. 3D the structure may be an oxidizer or fuel, or the cell pores may contain a fuel or oxidizer.

Figure 4A:
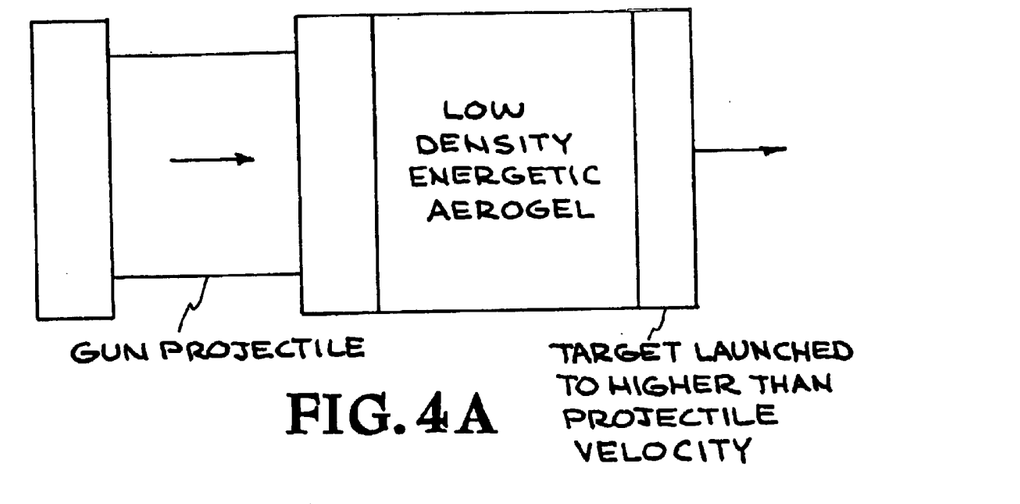
FIGS. 4A–4C illustrate low density energetic material made in accordance with the present invention which may serve as hydrodynamic working fluids.
Figure 4B:
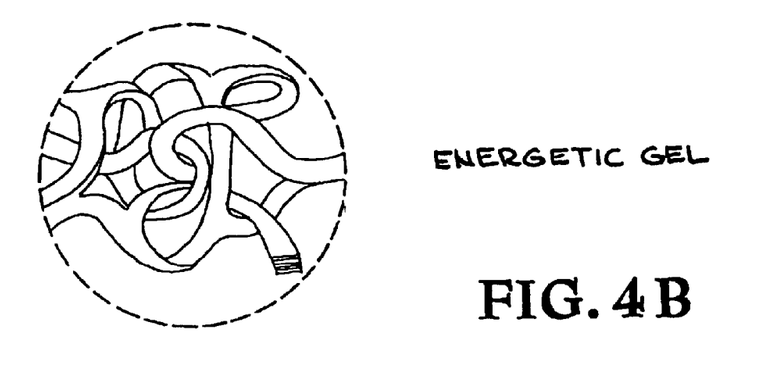
Figure 4C:
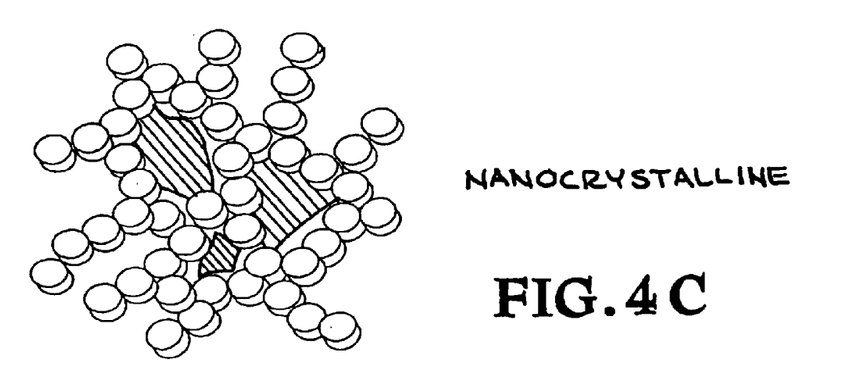

As shown in FIG. 4A, low density energetic materials may serve as hydrodynamic fluids. This may be accomplished by providing a low density structural support, that can gasify, such as an explosive aerogel as shown in FIG. 4A which may be formulated using the sol-gel chemistry approach to provide an energetic gel as seen in FIG. 4B, or a nanocrystalline structure containing the explosive as shown in FIG. 4C. Activation of the explosive aerogel produces a fluid as indicated by the arrows in FIG. 4A. Sol-gel chemistry provides for tailored and energetic staging fluids (e.g., soft launches).

Figure 5:
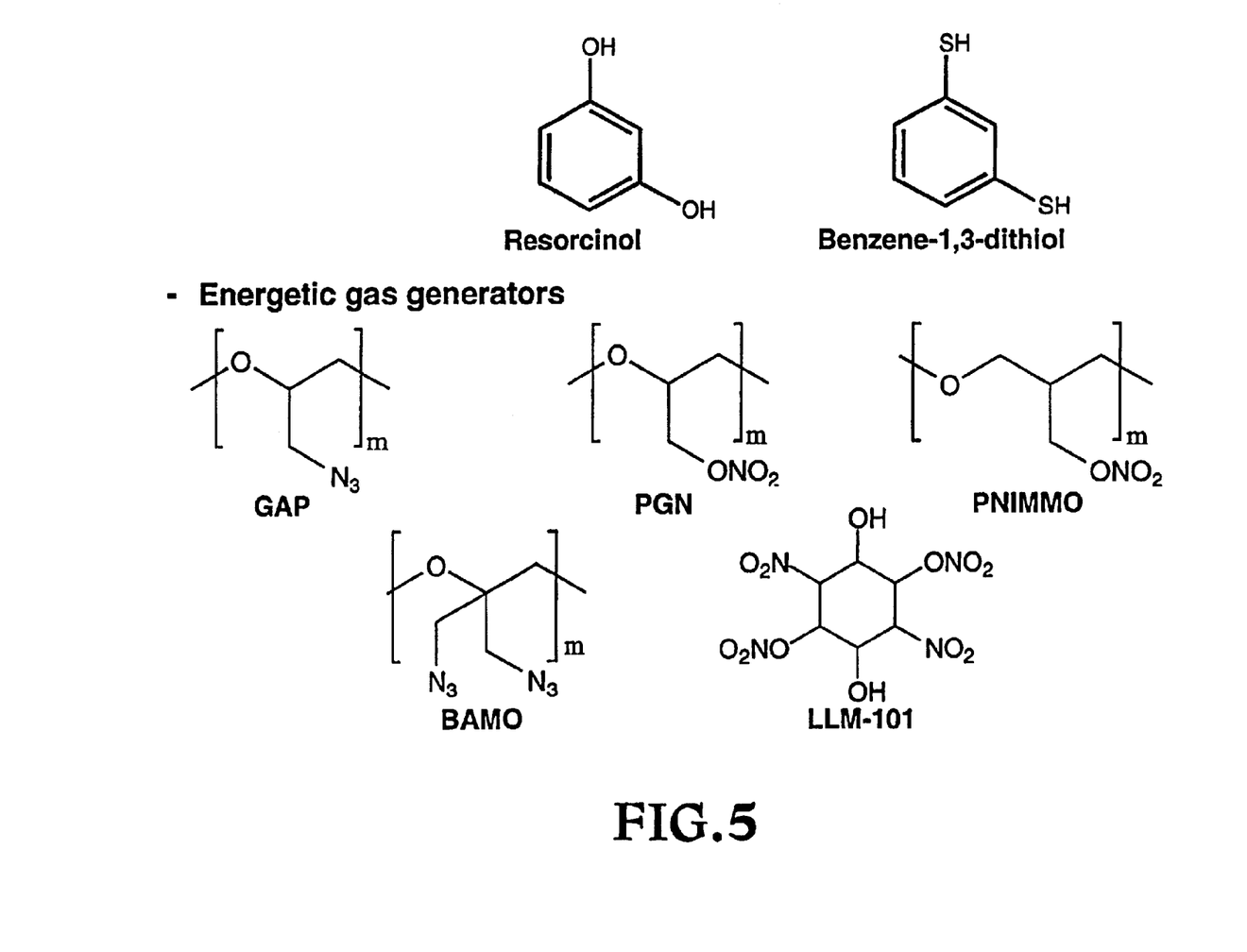
FIG. 5 illustrates multifunctional energetic monomers which can control the gel composition in producing energetic materials by sol-gel chemistry.

FIG. 5 illustrates multifunctional energetic monomers which can control gel composition, using traditional sol-gel monomers resorcinol and benzene-1,3-dithiol, or using energetic gas generators GAP, PGN, PNIMMO, BAMO, and LLM-101.

Figure 6:
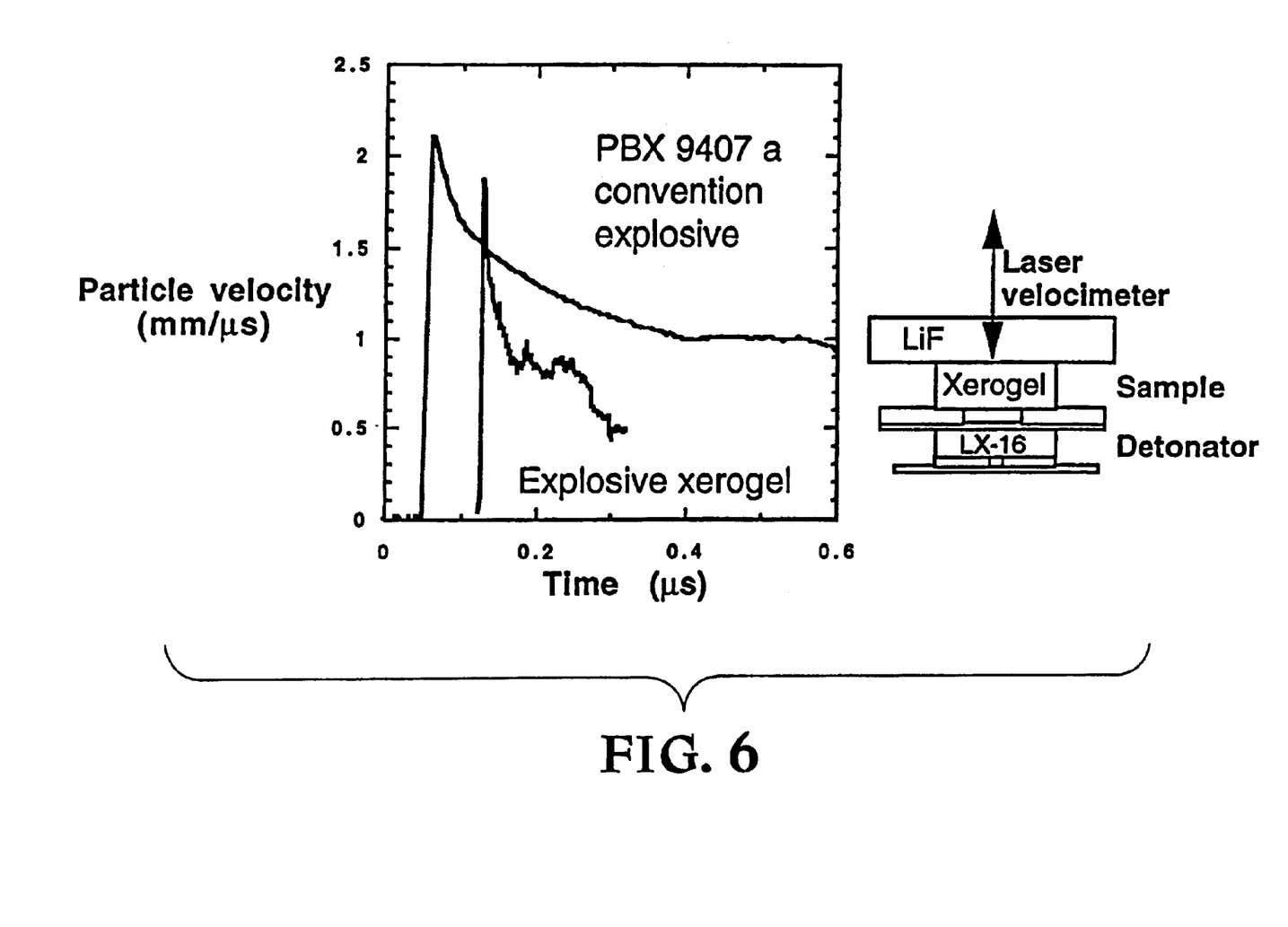
FIG. 6 graphically illustrates high explosive detonation experiments utilizing an RDX xerogel made in accordance with the present invention.

FIG. 6 graphically illustrates the results of shock initiation experiments using RDX porous xerogel. The experiments illustrated the inability to initiate 33 wt. % RDX porous xerogel, and the ability to initiate 80 wt. % RDX porous xerogels.

As pointed out above, traditional manufacturing of energetic materials involves processing granular solids, and in the production of detonators, for example, powders of energetic material and a binder are typically mixed and compacted at high pressure to make pellets. Performance properties are strongly dependent on particle size distribution, surface area of its constituents, homogeneity of the mix, and void volume. By sol-gel processing in accordance with the present invention, detonators can be produced with fast energy release rate and are insensitive to unintended initiation. The following sets forth the preparation of such detonators from xerogel molding powders and aerogels.

Sol-gel chemistry is known in the art for producing a variety of metal oxide, organic, and carbon aerogels and xerogels, and these materials have been utilized for various purposes. The composition of the aerogels or xerogels is varied by the sol-gel processing, whereby various surface areas, densities, etc. can be produced. These materials have found use in various insulation applications including the recent Mars Pathfinder mission, electrochemical applications such as electrodes in ultra capacitors, molds for the casting of metals, and for the capture of cosmic dust. Thus, a detailed description of the sol-gel processing is not deemed necessary except for the application to the manufacture of energetic materials, and the above-described general sol-gel processing technique is deemed sufficient. While numerous synthetic routes utilizing sol-gel processing of energetic materials, which include solution addition, solution exchange, powder/particle addition, functionalized solid network, functionalized explosive network, and micron to submicron scale composites (nano-composites), each briefly described above, four of these processing approach have been thus far experimentally verified, and a detailed description of each is set forth, followed by a brief description of the characterization of these materials.

Solution Addition:

The idea is to crystallize the energetic material within the pores of a sol-gel derived solid. In practice, the energetic material is dissolved in a solvent which is compatible with the reactants and used for density control of the resulting gel. Optimum composition for use as detonators would be approximately 90 wt. % energetic material/10 wt. % inert matrix. Due to the solubility limits of most energetic materials the preparation of low density porous solids are necessitated to meet this requirement. For this work, energetic molecules, hexahydro-1,3,5-trinotro-1,3,5-triazine (RDX) and 2,2-bis[(nitroxy)methyl]-1,3-propaneidiol,dinitrate (PETN), were crystallized within the pores of silica matrices.

Either single or two-step silicon alkoxide synthesis methodology described elsewhere [2,14,15] may be used to prepare the silica matrix. We found it necessary to prepare and mix three solutions in this synthesis to avoid unwanted precipitation of the energetic material. A 100% excess of water was added to promote the hydrolysis reactions. Either an acid or base catalyst may be used but for reasons discussed later fluoroboric acid is our catalyst of choice. A typical recipe would consist of: solution A—1.25 g tetramethoxysilane CrMOS)+1.00 g acetone, solution B—1.00 g acetone+0.60 g water+150 $\mu$l fluoroboric acid, solution C—6.00 g acetone+0.4000 g RDX. Subsequential additions of solutions B and C are poured into a stirring solution A. This combined solution is stirred for a few minutes and poured into molds where gelation occurs in <24 hours. The mass weight of the silica matrix is controlled by the amount of alkoxide added to solution A, while the mass weight of RDX is limited to its solubility in acetone. Xerogeling was done at 25° C. by poking pinholes in the polyethylene foil covering the mold held in place by rubber bands. Supercritical extraction (SCE) of the gels into aerogels was done by the low temperature $CO_2$ process. To prevent loss of the solubilized energetic molecule during SCE, the RDX or PETN was first crystallized within the pores of the matrix by replacing the pore liquor with a solvent in which the energetic material is insoluble but one which is still miscible in $CO_2$. Ethanol was used for these experiments. The pore liquor was exchanged along with the crystallization of the energetic molecule by immersing the gel into large excesses of ethanol three times over 24 hours. This extraction route was preferred to the high temperature autoclave process because most energetic molecules, like RDX and PETN, are extremely heat sensitive either degrading or detonating at temperatures >100° C.

Powder/Particle Addition:

Loading particles/powders uniformly inside gels is problematic because even ultrafine particles will tend to settle before the gel sets up, producing a non-uniform distribution. Also, particles will agglomerate in solution exacerbating this problem further. We describe here, for the first time, a methodology which we call the gel mending approach that dramatically improves the homogeneity of particle loaded monoliths. Conceptually, it makes use of the observation that a monolithic gel can be re-generated from gel fragments. First, a gel is prepared. Then the gel is fractionated by any process that breaks the gel into small fragments, i.e., a blender. With continued mixing, the powder/particles are added until a uniform dispersion is reached. Gels made from metal alkoxides will self-mend and reform a monolith including the dispersed powder/particles with the addition of a small amount of solvent. At this point, the gel can be dried by the above mentioned processes to produce xerogels and aerogels with a uniform distribution of the powder or particles.

For this work, we made silica gels from TMOS, dispersing either RDX or PETN, and reforming the gel with a small addition of methanol. The reformed gels were translucent to opaque depending on the wt. % concentration of the energetic material. Xerogel molding powders were produced by the above described xerogeling process and pressed into pellets for drop hammer sensitivity and shock initiation experiments. One advantage of this approach over the solution addition approach is the ease of preparing highly concentrated energetic materials with precise wt. % ratio's.

Functionalized Solid Networks:

Building in functionalized reaction sites as part of the solid network is one way to disperse an energetic molecule on the molecular scale. Either the energetic molecule can bond directly with the functionalized site or another functional group can be bound to this site which in turn captures the energetic molecule. One idea of how this might work is to use reactive monomers which have functional sites that don't participate in the crosslinking reactions leading to the gel state. Dissolution of the energetic molecule in mutually compatible solvents and diffusing into the gel allows the energetic material to react and bind to that functionalized site. As such, the amount of energetic molecules may be controlled by the number of functionalized sites while ensuring homogeneity at the molecular level.

We have synthesized organic aerogels with thiol groups (—SH) distributed along the solid network by reacting 1,3-dithiol benzene with formaldehyde using a base catalyst. In order to get the 1,3 dithiol benzene into a water solution it was necessary to use the sodium salt. To do this, sodium was reacted with an excess of methanol to prepare sodium methoxide which upon the addition of 1,3 dithiol benzene forms as products the sodium salt and methanol. All reactions were carried out under nitrogen in a shrink line. The excess methanol is distilled off and the sodium salt added to a formaldehyde/water/catalyst solution to induce gelation. As in previous organic synthesis with resorcinol, 2 moles of formaldehyde for each mole of the sodium salt is used, water as the diluent for density control, and sodium carbonate as a base catalyst. Gelation at 70° C. was considerably longer than the R-F gels. A yellow transparent gel was exchanged with acetone prior to xerogeling or low temperature $CO_2$ SCE.

Nano-Composites:

Our invention of a nano-composite material is essentially a physical mixture of fuels and oxidizers at the molecular level. Energetic materials primary ingredients are oxidizers and fuels. Here, we use sol-gel technology to compose the solid skeleton out of a fuel while trapping the oxidizer within the pores or vice versa. One goal which has eluded conventional technology is to create a nano composite that has the energy of a rocket propellant along with the power of a high explosive. Through mixing at the molecular level, reaction rates can be dramatically increased using sol-gel chemistry.

Our early experimental work has been to prepare an organic skeleton to be used as the fuel with an oxidizer trapped in the meso-pores. The organic skeleton is synthesized from the polycondensation of resorcinol (1,3-dihydroxybenzene) with formaldehyde. The basic recipe is two moles of formaldehyde for every mole of resorcinol base, catalyzed with sodium carbonate. The oxidizer, ammonium perchlorate, is dissolved in water and is used as a diluent in the synthesis for density control. Gel times at 40° C. for the resorcinol/catalyst ratio (R/C=50) used was approximately 2 days, which is considerably longer than the synthesis without ammonium perchlorate. The water was exchanged with methanol prior to xerogeling and with either methanol or ethlyacetate prior to low temperature $CO_2$ SCE.

Characterization Methods:

Characterization of these materials is more difficult than typical sol-gel derived materials due to the energetic component of the matrices. Differential scanning calorimetry (DSC) was used to determine if the energetic material was present in the final dried products. Optical, scanning and transmission electron microscopy were used to study the microstructure.

The drop hammer test, a standard energetic material characterization technique, was used to measure the impact sensitivity of our produced materials. In this test, a 2.5 kg weight is dropped from a pre-set height onto a 35 mg pressed pellet of material, and explosion or non-explosion is recorded. Depending on this outcome the hammer is raised or lowered, resulting in a series of drops with either explosion or non-explosion being recorded. The criterion for "explosion" is an arbitrary set level of sound produced by the explosive or impact. The tests were summarized as $H_{50}$, the height in centimeters in which the probability of explosion is 50%.

The shock initiation experiments, see FIG. 6, used to determine if these materials were detonable were done by the flyer-plate technique, another energetic material standard. In this technique, an explosive charge is ignited with the expanding gas pressure slamming into a metal foil sending a shock wave through a pressed pellet which is observed through a lithium fluoride crystal by a laser velocimeter.

The differential scanning calorimetry (DSC) analysis confirmed the presence of RDX and PETN in the sol-gel processed materials. PETN based materials had a small endotherm at 143° C. followed by an exotherm at 200° C. characteristic of neat PETN. Corresponding agreement with RDX was found with RDX based aerogels and xerogels.

Monolithic aerogels prepared by the solution addition of RDX showed that monolithiticity was maintained in compositions up to 45 wt. % RDX in a 55 wt. % $SiO_2$ matrix.

The impact sensitivity of an energetic material to unintended initiation is an important safety factor in their use. The drop-hammer sensitivity tests gave some surprising results, which showed that pellets pressed from xerogel molding powders prepared by the powder/particle addition method have significantly lower sensitivities than current state-of-the-art powder mixing technology.

Desensitized materials are only an improvement in technology if they are still able to be ignited with reasonable power outputs. The shock initiation experiment shown in FIG. 6 demonstrated this possibility when an 80 wt. % RDX xerogel molding powder pressed into a detonator pellet was able to be ignited, while a 33 wt. % RDX concentration would not ignite. While RDX and PETN have been utilized in the experimental test other energetic materials such as HMX, CL-20, TNT, and peroxides may be used as ingredients.

It has thus been shown that the present invention enables the manufacture of energetic materials using sol-gel chemistry. Also, it has been shown that various methods utilizing sol-gel processing successfully produce energetic materials. Also, it has been shown that sol-gel processing of energetic materials has produced desensitized detonator explosives which are still capable of initiation.

While specific processing procedures, materials, parameters, etc. have been described and/or illustrated to exemplify and teach the principles of the invention, such are not intended to be limiting. Modifications and changes may become apparent to those skilled in the art, and it is intended that the invention be limited only by the scope of the appended claims.

The invention claimed is:

1. A process comprising:

providing a predetermined amount of a monolithic gel made from a metal alkoxide;

fractionating said gel;

adding a predetermined amount of an energetic material to said fractionated gel to form a uniform dispersion of gel and energetic material;

adding a solvent to said uniform dispersion; and drying said uniform dispersion to reform said gel to form a monolithic composite wherein said energetic material is uniformly dispersed throughout said monolithic reformed gel.

2. The process recited in claim 1, wherein said gel is a silica gel made from tetramethyl orthosilicate (TMOS).

3. The process recited in claim 1, wherein said energetic material is RDX or PETN.

4. The product produced by the process recited in claim 1.

5. A method comprising:

dissolving at least one silicon alkoxide in a solvent to form a silicon alkoxide solution;

dissolving at least one energetic material in a solvent to form an energetic material solution, said solvent being the same solvent as said silicon alkoxide is dissolved in;

dissolving a catalyst in a solvent to form a catalyst solution, said solvent being the same solvent as said silicon alkoxide is dissolved in;

pouring alternating portions of said catalyst solution and said energetic material solution into said silicon alkoxide solution with stirring to form a gel precursor solution;

allowing said gel precursor solution to gel; and drying said gel to form a monolithic energetic composite having energetic molecules crystallized within the pores of a silicon sol-gel material.

* * * * *